US012572769B2

(12) United States Patent
Min et al.

(10) Patent No.: US 12,572,769 B2
(45) Date of Patent: Mar. 10, 2026

(54) ELECTRONIC COMPONENT STORAGE CONTAINER MONITORING SYSTEM BY USE OF WIRELESS POWER TRANSMISSION AND RECEPTION

(71) Applicant: FINE POWERX CORPORATION, Ulsan (KR)

(72) Inventors: Byung Duk Min, Yongin-si (KR); Jin Ha Choi, Yongin-si (KR)

(73) Assignee: FINE POWERX CORPORATION, Yongin-si (KR)

( * ) Notice: Subject to any disclaimer, the term of this patent is extended or adjusted under 35 U.S.C. 154(b) by 364 days.

(21) Appl. No.: 18/279,375

(22) PCT Filed: Feb. 9, 2022

(86) PCT No.: PCT/KR2022/002009
§ 371 (c)(1),
(2) Date: Aug. 29, 2023

(87) PCT Pub. No.: WO2022/225154
PCT Pub. Date: Oct. 27, 2022

(65) Prior Publication Data
US 2024/0202479 A1      Jun. 20, 2024

(30) Foreign Application Priority Data

Apr. 21, 2021    (KR) ......................... 10-2021-0051793
Jun. 7, 2021    (KR) ......................... 10-2021-0073799

(51) Int. Cl.
*G06K 19/00*        (2006.01)
*B65G 1/02*        (2006.01)
(Continued)

(52) U.S. Cl.
CPC ............. *G06K 19/005* (2013.01); *B65G 1/02* (2013.01); *G06K 19/0708* (2013.01);
(Continued)

(58) Field of Classification Search
CPC ............. G06K 19/005; G06K 19/0708; G06K 19/0717; B65G 1/02; H02J 50/10;
(Continued)

(56) References Cited

U.S. PATENT DOCUMENTS

| 9,287,936 B2 * | 3/2016 | Ali ........................ | H02J 50/005 |
| 11,624,732 B2 * | 4/2023 | Murata .................. | G01N 29/46 |
| | | | 73/579 |
| 11,921,479 B2 * | 3/2024 | Valin ....................... | H02S 10/10 |

FOREIGN PATENT DOCUMENTS

| KR | 10-2011-0002725 A | 1/2011 |
| KR | 10-2013-0028253 A | 3/2013 |

(Continued)

*Primary Examiner* — Michael Collins
(74) *Attorney, Agent, or Firm* — PARK LAW FIRM

(57) ABSTRACT

The present invention relates to a technology for monitoring the states of a plurality of electronic components stored in a warehouse and, particularly, relates to a technology for wirelessly supplying power to a plurality of sensor modules that sense the state of each electronic component while a plurality of storage containers accommodating a plurality of electronic components are stored in a plurality of racks, and monitoring the state of each electronic component. According to the present invention, the state of each electronic component can be checked while current storage positions of the plurality of electronic components are maintained as they are. In addition, according to the present invention, the states of the plurality of electronic components stored in the warehouse can be frequently monitored within a short time.

3 Claims, 6 Drawing Sheets

(51) Int. Cl.
*G06K 19/07* (2006.01)
*G06Q 10/087* (2023.01)
*H02J 50/10* (2016.01)
*H04B 5/79* (2024.01)

(52) U.S. Cl.
CPC .......... *G06K 19/0717* (2013.01); *H02J 50/10* (2016.02); *H04B 5/79* (2024.01); *G06Q 10/087* (2013.01)

(58) Field of Classification Search
CPC .. H02J 50/12; H02J 50/20; H02J 50/40; H02J 50/402; H02J 50/80; H02J 50/90; H04B 5/79; G06Q 10/087; G01D 21/02; G01R 31/367; G01R 31/385
See application file for complete search history.

(56) References Cited

FOREIGN PATENT DOCUMENTS

| | | | |
|---|---|---|---|
| KR | 10-2017-0008930 | A | 1/2017 |
| KR | 10-2017-0034087 | A | 3/2017 |
| KR | 10-2017-0111393 | A | 10/2017 |

* cited by examiner (10 : 11, 12, 13, 14)

'EXTERNAL POWER SUPPLY'

ELECTRONIC COMPONENT STORAGE CONTAINER MONITORING SYSTEM BY USE OF WIRELESS POWER TRANSMISSION AND RECEPTION

FIELD OF THE INVENTION

The present invention relates to a technology for monitoring the states of a plurality of electronic components stored in a warehouse.

More particularly, the present invention relates to a technology for wirelessly supplying power to a plurality of sensor modules that sense the state of each electronic component while a plurality of storage containers accommodating a plurality of electronic components are stored in a plurality of racks, and monitoring the state of each electronic component.

In particular, the present invention relates to a technology for monitoring the state of each electronic component while maintaining a state in which the pluralities of storage containers which contain the plurality of electronic components are stored in the racks.

BACKGROUND ART

In general, hundreds of thousands of electronic components corresponding to aging target objects may be stored in one warehouse, for example. An increase in scale of a warehouse storing electronic components results in an environment where the electronic components may have temperature fluctuations depending on locations even in one warehouse.

Meanwhile, the electronic components stored in the warehouse go through a stabilization phase, and the electronic components are determined to be in good conditions by checking intermittently the direct conditions (for example, voltage, temperature, impedance, humidity, or the like) to see whether these electronic components are going through the stabilization stage well.

In the related art, in order to check states of hundreds of thousands of electronic components, a storage container (tray) containing electronic components in a unit of a certain number of electronic components is moved to a condition measurement place, states of the electronic components are measured, and then the electronic components are moved back to the original locations for storage. However, this approach is inefficient.

It may be possible to move the storage containers around to check the states thereof if the number of electronic components stored in a warehouse is not large. However, when hundreds of thousands of electronic components are stored in one warehouse, a problem arises in that it takes too long to check the states of each electronic component while moving the storage containers around. In addition, this makes it difficult to shorten a state check cycle.

Accordingly, there is a demand for an embodiment of a technology that can solve the problems of the related art by monitoring the states of each electronic component while maintaining positions of the storage containers of the electronic components stored in a warehouse.

DISCLOSURE OF INVENTION

Technical Problem

An object of the present invention is to provide an electronic component storage container monitoring system by use of wireless power transmission and reception that can wirelessly supply power to individual sensors that sense the state of a plurality of electronic components and can check the state of each electronic component while current storage positions of the plurality of electronic components are maintained as they are.

In addition, another object of the present invention is to provide an electronic component storage container monitoring system by use of wireless power transmission and reception that can monitor the states of a plurality of electronic components stored in a warehouse at any time.

Technical Solution

The present invention provides an electronic component storage container monitoring system by use of wireless power transmission and reception that is individually installed at respective storage containers and a mounting at positions corresponding to the respective storage containers in the mounting rack in which the storage containers storing a plurality of electronic components are stacked in multiple tiers, and that monitors states of the electronic components in a corresponding storage container.

The electronic component storage container monitoring system by use of wireless power transmission and reception according to the present invention includes: a plurality of wireless power RX members 100 that are attached to a plurality of storage containers, respectively, and monitor states of electronic components in each storage container; a plurality of wireless power TX members 200 that are operated with power supplied from outside while being attached to a mounting rack close to the wireless power RX members, wirelessly supply power to the wireless power RX members, collect, through short-range communication, state data of corresponding electronic components monitored by the wireless power RX members, and provide the state data to a parent managing server; and a storage container managing server member that collects and manages state data of the electronic components corresponding to the plurality of storage containers acquired from the plurality of wireless power TX members.

Each of the wireless power RX members 100 may further include: a measurement sensor member 110 that detects state information including voltages and currents for the electronic components in the storage containers; a temperature sensor member 120 that detects temperatures of the storage containers; an RX short-range communication member 130 that provides data detected by the measurement sensor member and the temperature sensor member to the wireless power TX members through the short-range communication; an RX pad member 140 that induces a voltage from a magnetic field due to an electric current flowing through the wireless power TX members; a rectifier member 150 that converts power induced by the RX pad member into DC; and an RX control member 160 that controls operations of the measurement sensor member, the temperature sensor member, the RX short-range communication member, the RX pad member, and the rectifier member.

In this case, each of the wireless power TX members 200 may further include: an SMPS member 210 that receives power from outside and provides DC power; a TX pad member 220 that forms a magnetic field by allowing an electric current to flow such that the RX pad member induces the voltage; a TX short-range communication member 230 that performs short-range communication with the RX short-range communication member to acquire data detected by the measurement sensor member and the temperature sensor member; a TX wireless power control member 240 for controlling power supply to the TX pad member; and a TX control member 250 that controls operations of the SMPS member, the TX pad member, the TX short-range communication member, and the TX wireless power control member.

Meanwhile, each of the wireless power TX members 200 may further include a distance sensor member 260 that measures a separation distance from a target object by irradiating the target object with a laser.

Each of the wireless power RX members 100 may further include an RX recognition reflective member 170 that reflects the laser irradiated from the distance sensor member such that the distance sensor member senses a separation distance from the RX recognition reflective member.

In this case, the TX wireless power control member 240 may be configured to determine an amount of current flowing through the TX pad member based on the separation distance from the RX recognition reflective member obtained by the distance sensor member.

On the other hand, each of the wireless power TX member 200 may further include a wireless communication member 270 for transmitting the state data of the electronic components for a corresponding storage container acquired from the wireless power RX member through short-range wireless communication.

On the other hand, the electronic component storage container monitoring system by use of wireless power transmission and reception may be configured to further include a plurality of mounting frame members 400 that connect vertical frames of the mounting rack such that the wireless power TX members can be arranged to correspond to front surfaces of the wireless power RX members 100. In this case, the wireless power TX members may be mounted on a mounting frame member.

Advantageous Effects

The present invention is advantageous in that state of each electronic component can be checked while current storage positions of the plurality of electronic components are maintained.

In addition, the present invention is also advantageous in that the states of the plurality of electronic components stored in a warehouse can be frequently monitored within a short time.

EMBODIMENT FOR CARRYING OUT THE INVENTION

Hereinafter, the present invention will be described in detail with reference to the drawings.

Figure 1:
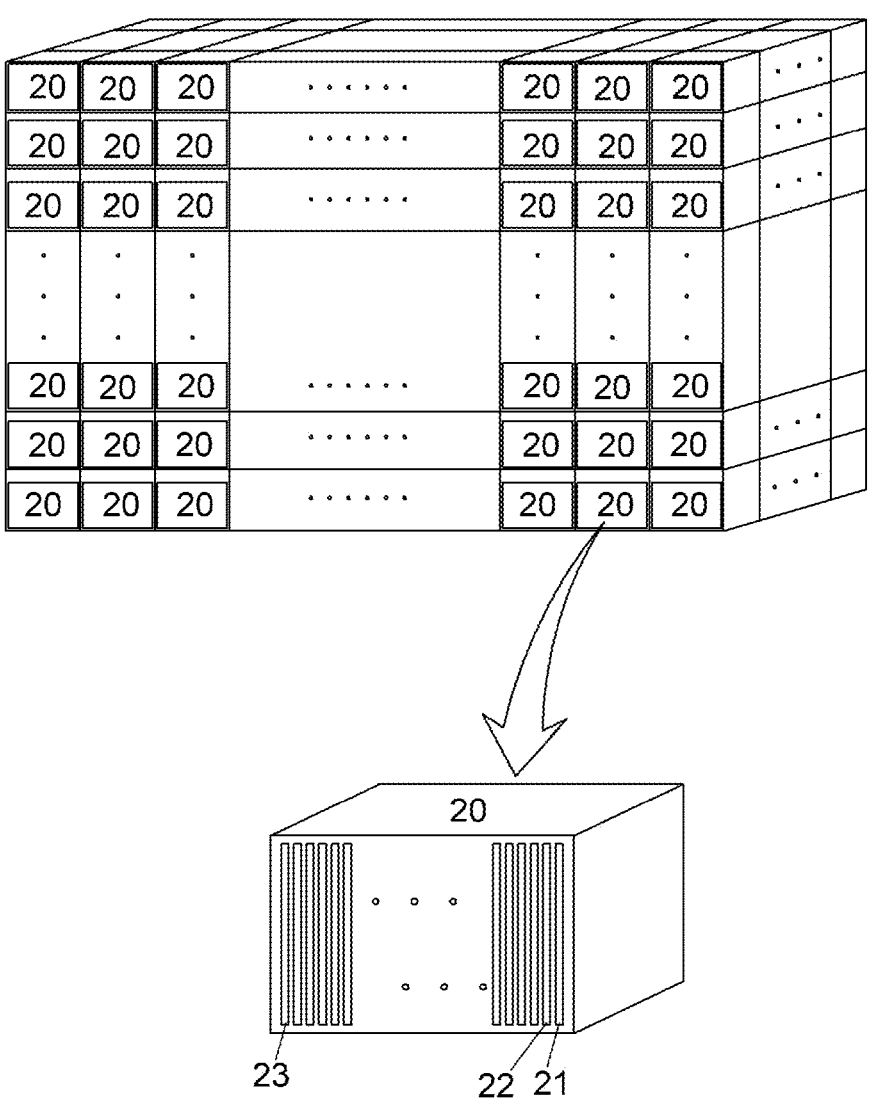
FIG. 1 is an example view illustrating a mounting rack in a warehouse where an electronic component storage container monitoring system by use of wireless power transmission and reception according to the present invention will be installed.
Figure 2:
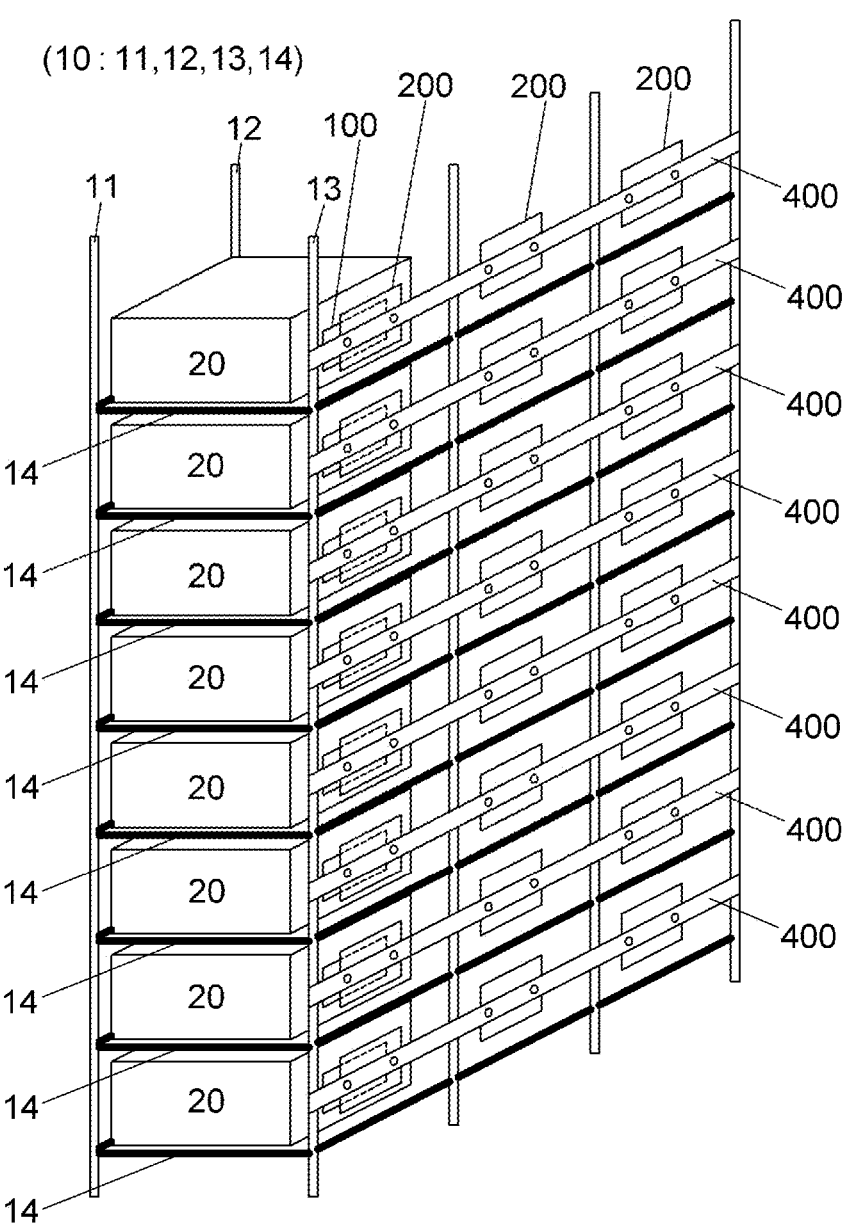
FIG. 2 is an example view schematically illustrating only a part of FIG. 1 in which the electronic component storage container monitoring system by use of wireless power transmission and reception according to the present invention is installed for the mounting rack of FIG. 1.

FIG. 1 is an example view schematically illustrating a mounting rack in the warehouse where an electronic component storage container monitoring system by use of wireless power transmission and reception will be installed, in a state in which storage containers containing a plurality of electronic components are stored in a mounting rack of a warehouse. FIG. 2 is an example view schematically illustrating only a part of FIG. 1 in which the electronic component storage container monitoring system by use of wireless power transmission and reception according to the present invention is installed for the mounting rack of FIG. 1, and FIG. 3 is an enlarged view of a part excerpted from FIG. 2.

Figure 3:
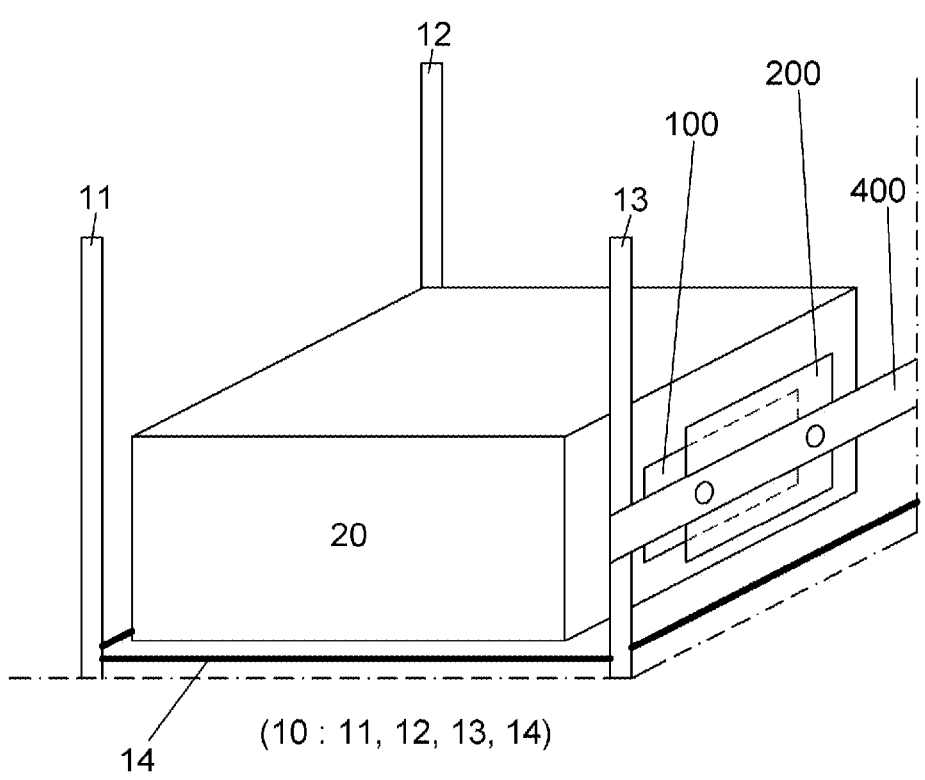
FIG. 3 is an enlarged view of a part excerpted from FIG. 2.

The electronic component storage container monitoring system by use of wireless power transmission and reception according to the present invention may be installed at a mounting rack 10 in a warehouse housing one or more mounting racks 10 as illustrated in FIGS. 2 and 3.

In this case, the mounting rack 10 can be manufactured to include a plurality of vertical frames 11, 12, and 13 and a plurality of horizontal mounting panels 14 such that storage containers 20 storing a plurality of electronic components can be stacked in multiple tiers.

The electronic component storage container monitoring system by use of wireless power transmission and reception according to the present invention can be installed at the storage container 20 and the mounting rack 10, and specifically can be installed at the storage container 20 and a mounting frame member 400 of the mounting rack 10 as illustrated in FIGS. 2 and 3.

In this respect, the present invention can include a plurality of mounting frame members 400 as illustrated in FIGS. 2 and 3. In other words, the mounting frame members 400 can be arranged to connect between a vertical frame of the mounting rack 10 and another vertical frame adjacent to the vertical frame and, preferably, can be arranged in multiple tiers as illustrated in FIG. 2.

As a result, wireless power TX members 200 can be arranged at positions corresponding to front surfaces of wireless power RX members 100 which are each installed at one side portion of the storage container 20 as illustrated in FIGS. 2 and 3.

Hereinafter, the wireless power RX member 100 and the wireless power TX member 200 of the present invention will be described in detail with reference to FIGS. 4 and 5.

Figure 4:
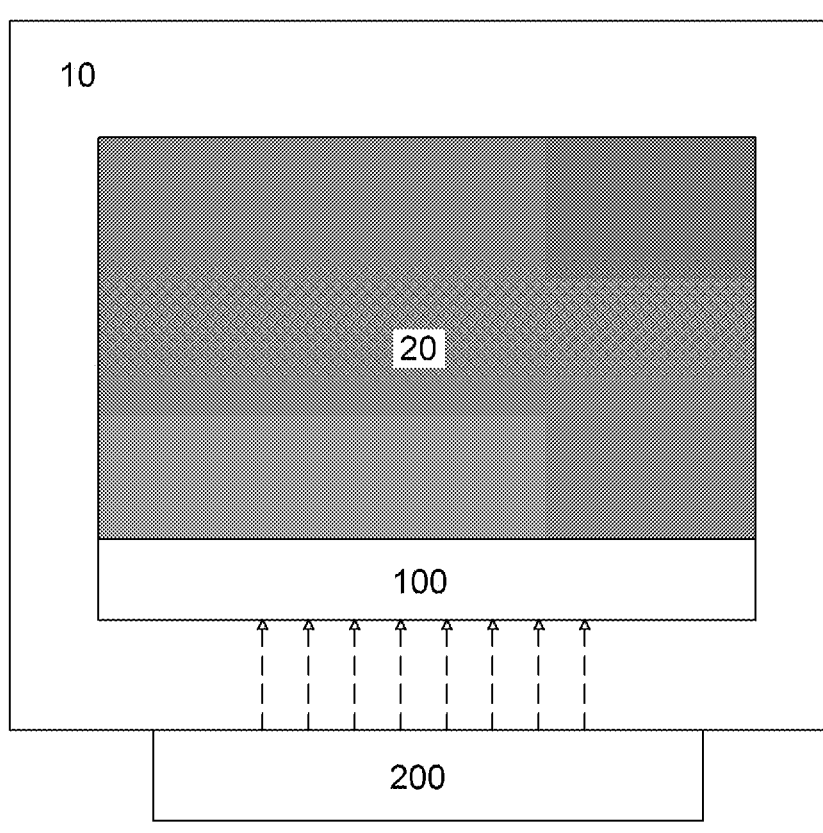
FIG. 4 is a view schematically illustrating a state of the view of FIG. 3 when viewed from top to bottom.
Figure 5:
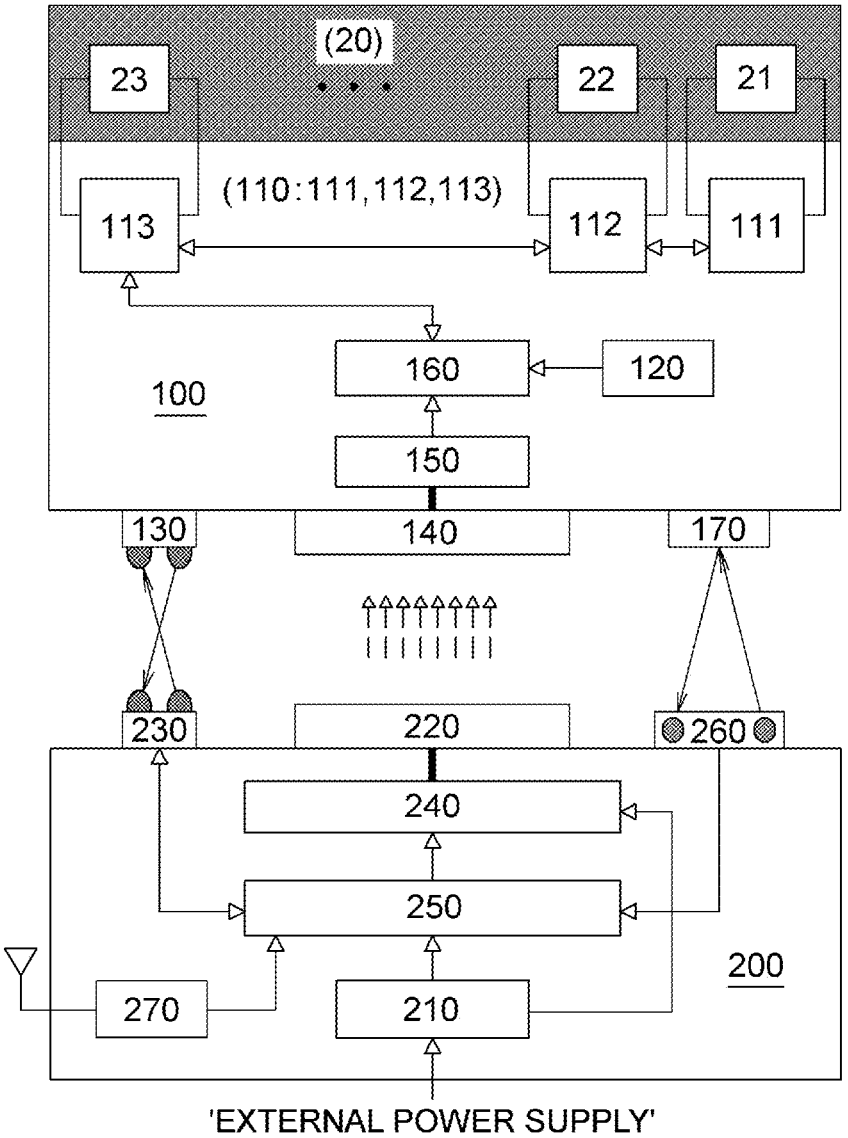
FIG. 5 is a view specifically illustrating the view of FIG. 4.

FIG. 4 is a view schematically illustrating a state of the view of FIG. 3 when viewed from top to bottom, and FIG. 5 is a view specifically illustrating the view of FIG. 4.

The electronic component storage container monitoring system by use of wireless power transmission and reception according to the present invention can be configured to include a plurality of wireless power RX members 100, a plurality of wireless power TX members 200, and a storage container managing server member (not illustrated).

Referring to FIGS. 2 and 5, the wireless power RX members 100 can be configured to be attached to a plurality of storage containers 20, respectively, and individually monitor states of the electronic components 21, 22, and 23 in each storage container 20. In this respect, each of the wireless power RX members 100 can include a measurement sensor member 110, a temperature sensor member 120, an RX short-range communication member 130, an RX pad member 140, a rectifier member 150, an RX control member 160, and an RX recognition reflective member 170.

The measurement sensor member 110 can detect state information (impedance) including voltages and currents for the electronic components 21, 22, and 23 in the storage container 20. The measurement sensor member 110 can be configured to preferably be energized individually with the electronic components 21, 22, and 23 to sense the state information of the individual electronic components 21, 22, and 23. In this respect, the measurement sensor member 110 can have a patterned measurement circuit configuration for sensing the state information of the individual electronic components 21, 22, and 23.

The temperature sensor member 120 can be configured to detect a temperature of a storage container 20 assigned to the temperature sensor member.

The RX short-range communication member 130 can be configured to provide, to the wireless power TX member 200, data (for example, voltage, current, impedance, temperature, humidity) detected by the measurement sensor member 110 and the temperature sensor member 120 through short-range communication (for example, short-range infrared communication) with a TX short-range communication member 230.

The RX pad member 140 interfaces power supply for each configuration of the wireless power RX member 100 by inducing a voltage from a magnetic field caused by a current flowing through the wireless power TX member 200.

The rectifier member 150 interfaces DC power supply for each configuration of the wireless power RX member 100 by converting power induced by the RX pad member 140 into DC power.

The RX control member 160 controls overall operations of the wireless power RX member 100 including the measurement sensor member 110, the temperature sensor member 120, the RX short-range communication member 130, the RX pad member 140, and the rectifier member 150.

The RX recognition reflective member 170 is disposed at a position corresponding to a front surface of a distance sensor member 260 included in the wireless power TX member 200 and reflects a laser irradiated from the distance sensor member 260.

The wireless power TX members 200 can be individually mounted on the mounting rack 10 close to the plurality of wireless power RX members 100 as illustrated in FIGS. 2 and 3. The wireless power TX member 200 can be operated with power supplied from the outside to wirelessly supply power to the wireless power RX member 100. The wireless power TX member 200 can collect the state data of the corresponding electronic components 21, 22, and 23 monitored by the wireless power RX member 100, for example, through 'short-range infrared communication' and provide the state data to the storage container managing server member (not illustrated). In this respect, the wireless power TX member 200 can include an SMPS member 210, a TX pad member 220, the TX short-range communication member 230, a TX wireless power control member 240, a TX control member 250, the distance sensor member 260, and a wireless communication member 270.

The SMPS member 210 receives power from the outside and supplies DC power to the wireless power TX member 200.

The TX pad member 220 can form a magnetic field by allowing a current to flow such that the RX pad member 140 induces a voltage, and to this end, the TX pad member 220 can be formed in a shape of a winding coil.

The TX short-range communication member 230 performs short-range communication (for example, short-range infrared communication) with the RX short-range communication member 130 to acquire the data detected by the measurement sensor member 110 and the temperature sensor member 120.

The TX wireless power control member 240 can be operated by control of the TX control member 250 and can be configured to directly control the power supply to the TX pad member 220. For example, when the TX control member 250 determines an amount of current which is to be supplied to the TX pad member 220 based on the data (for example, separation distance and brightness) detected by the distance sensor member 260, the TX control member 250 correspondingly issues a control command to the TX wireless power control member 240. Subsequently, the TX wireless power control member 240 can directly control (for example, turn on or turn off) an operation of the TX pad member 220 in accordance with the control command received from the TX control member 250.

The TX control member 250 controls overall operations of the wireless power TX member 200 including the SMPS member 210, the TX pad member 220, the TX short-range communication member 230, and the TX wireless power control member 240.

The distance sensor member 260 can be disposed at a position corresponding to a front surface of the RX recognition reflective member 170 included in the wireless power RX member 100. The distance sensor member 260 can receive light reflected from the RX recognition reflective member 170 by irradiating the RX recognition reflective member 170 with, for example, a laser and detect a separation distance from the RX recognition reflective member 170 based on the received information (for example, time or brightness).

The TX wireless power control member 240 can turn off or turn on the operation of the TX pad member 220. Specifically, the TX control member 250 can determine the amount of current flowing through the TX pad member 220 based on the separation distance information between the wireless power RX member 100 and the wireless power TX member 200 provided from the distance sensor member 260. Subsequently, the TX control member 250 can determine the amount of current that is to flow to the TX pad member 220 and issue a corresponding control command to the TX wireless power control member 240. In this case, the TX wireless power control member 240 turns on or turns off the operation of the TX pad member 220 based on the control command received from the TX control member 250.

The wireless communication member 270 can transmit the state data of the electronic components 21, 22, and 23 for the corresponding storage container 20 acquired from the wireless power RX member 100 through short-range wireless communication. The state data of the electronic components 21, 22, and 23 transmitted from the wireless communication member 270 can be transmitted to the storage container managing server member through a wireless LAN access point (AP) close to the wireless communication TX member 200.

The storage container managing server member (not illustrated) collects and manages the state data of the electronic components 21, 22, and 23 corresponding to the plurality of storage containers 20 acquired from the plurality of wireless power TX members 200. In this manner, since the storage container managing server member can manage the states of the plurality of electronic components stored in a warehouse through the plurality of wireless power RX members 100 and the plurality of wireless power TX members 200, it is possible to monitor the state information of the individual electronic components in the warehouse at any time within a relatively short period of time.

Figure 6:
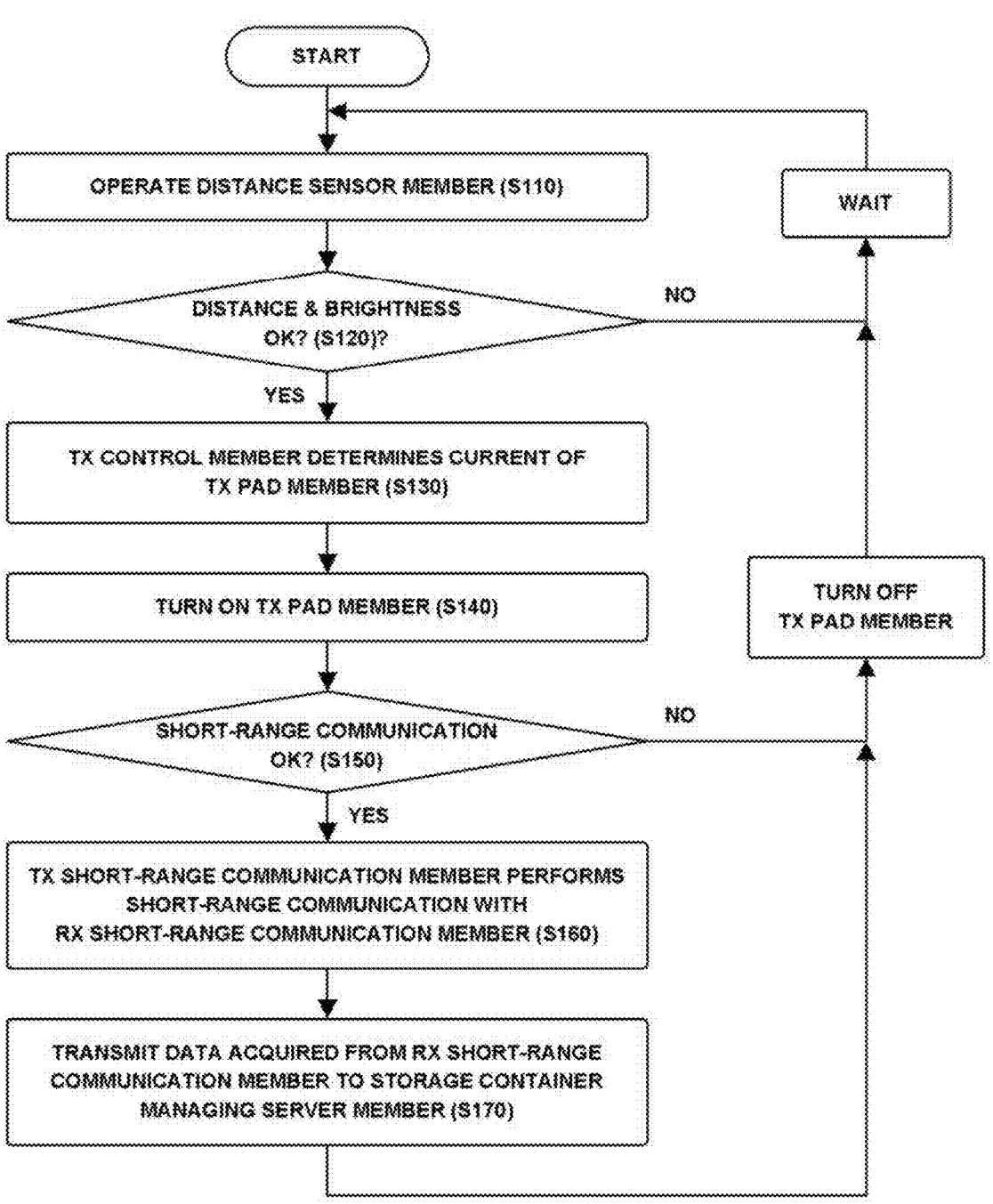
FIG. 6 is a flowchart schematically illustrating a process of operating a wireless power TX member corresponding to a wireless power RX member.

FIG. 6 is a flowchart schematically illustrating a process of operating the wireless power TX members corresponding to the wireless power RX members.

With reference to FIG. 6, the process in which the wireless power RX members 100 arranged in the storage containers 20 and the wireless power TX members 200 arranged to correspond to the wireless power RX members 100 interact in order to monitor the state information of a number of storage containers 20 stored in one or more mounting racks 10 and the plurality of electronic components 21, 22, and 23 contained in the individual storage containers 20 in the warehouse is as follows.

Step S110: When the distance sensor member 260 is operated in response to the control of the TX control member 250 to identify the separation distance between the wireless power RX member 100 and the wireless power TX member 200 in a state where power is supplied from the outside to the SMPS member 210 of the wireless power TX member 200, it is possible to determine that the storage container 20 that is a monitoring target is present based on the identified separation distance.

Step S120: The TX control member 250 determines the amount of current that is to flow to the TX pad member 220 based on the previously identified separation distance between the wireless power RX member 100 and the wireless power TX member 200 and issues a control command to the TX wireless power control member 240 in response to the determined amount of current.

Subsequently, the TX wireless power control member 240 directly controls the TX pad member 220 by turning on or turning off the TX pad member 220 depending on the amount of current that is to flow to the TX pad member 220 based on the control command.

The reason for adjusting the amount of current that is to flow to the TX pad member 220 is to ensure that an appropriate voltage is also induced in the RX pad member 140 of the wireless power RX member 100 with the appropriate current of the TX pad member 220. As a result, a sharp rise or a sharp drop of the voltage induced in the RX pad member 140 can be prevented.

Steps S130 and S140: The TX wireless power control member 240 operates in response to the control command of the TX control member 250 so as to turn on the TX pad member 220.

When the TX pad member 220 is turned on, a voltage is also induced to the RX pad member 140 such that power is supplied to the wireless power RX member 100 and to the sensor members provided in the wireless power RX member 100.

Step S150: Further, the TX control member 250 checks whether the TX short-range communication member 230 can be operated, and if the TX control member 250 determines that the TX short-range communication member 230 can be operated, the TX control member 250 controls short-range communication between the TX short-range communication member 230 and the RX short-range communication member 130.

When the TX control member 250 determines that the TX short-range communication member 230 cannot operate, the TX control member 250 can issue a control command to the TX wireless power control member 240 to turn off the operation of the TX pad member 220.

Steps S160 and S170: Further, the TX control member 250 can provide, to the storage container managing server member, information on the corresponding electronic components 21, 22, and 23 and the corresponding storage container 20 acquired from the RX short-range communication member 130 through short-range communication between the TX short-range communication member 230 and the RX short-range communication member 130.

In this case, the TX control member 250 can provide, to the wireless communication member 270, the state information about the corresponding electronic components 21, 22, and 23 and the corresponding storage container 20 acquired from the RX short-range communication member 130. Further, the wireless communication member 270 can transmit the information to the storage container managing server member via a wireless LAN access point (AP) close to the wireless power TX member 200.

The invention claimed is:

1. An electronic component storage container monitoring system by use of wireless power transmission and reception, comprising:

a mounting rack including a plurality of horizontal mounting panels arranged as a plurality of shelves such that storage containers storing a plurality of electronic components can be seated in a plurality of tiers, and a plurality of vertical frames that fix the horizontal mounting panels by being arranged in a vertical direction in a state of being connected to side walls of the horizontal mounting panels;

a plurality of storage containers seated on the horizontal mounting panels along a longitudinal direction of the horizontal mounting panels;

a plurality of wireless power RX members that are attached to the plurality of storage containers, respectively, and monitor states of the electronic components in the individual storage containers;

a plurality of mounting frame members arranged in a form of connecting the plurality of vertical frames along the longitudinal direction of the horizontal mounting panels to correspond to a front surface of each of the wireless power RX members;

a plurality of wireless power TX members that are operated with power supplied from outside while being attached to the mounting frame members corresponding to the front surface of each of the wireless power RX members, wirelessly supply power to the wireless power RX members, collect, through short-range communication, state data of corresponding electronic components monitored by the wireless power RX members, and provide the state data to a parent managing server; and a storage container managing server member that collects and manages state data of the electronic components corresponding to the plurality of storage containers acquired from the plurality of wireless power TX members, wherein each of the wireless power TX members includes a TX pad member that forms a magnetic field by allowing an electric current to flow, a TX wireless power control member for controlling power supply to the TX pad member, and a distance sensor member that measures a separation distance from a target object by irradiating the target object with a laser, wherein each of the wireless power RX members includes an RX pad member that induces a voltage from a magnetic field due to an electric current flowing through the wireless power TX members, and an RX recognition reflective member that reflects the laser irradiated from the distance sensor member such that the distance sensor member senses a separation distance from the RX recognition reflective member, and wherein the TX wireless power control member is configured to determine an amount of current flowing through the TX pad member based on the separation distance from the RX recognition reflective member obtained by the distance sensor member.

2. The electronic component storage container monitoring system according to claim 1, wherein each of the wireless power RX members further includes:

a measurement sensor member that detects state information including voltages and currents for the electronic components in the storage containers;

a temperature sensor member that detects temperatures of the storage containers;

an RX short-range communication member that provides data detected by the measurement sensor member and the temperature sensor member to the wireless power TX members through the short-range communication;

a rectifier member that converts power induced by the RX pad member into DC; and an RX control member that controls operations of the measurement sensor member, the temperature sensor member, the RX short-range communication member, the RX pad member, and the rectifier member, and wherein each of the wireless power TX members further includes:

an SMPS member that supplies DC power by receiving power from outside;

a TX short-range communication member that performs short-range communication with the RX short-range communication member to acquire data detected by the measurement sensor member and the temperature sensor member; and a TX control member that controls operations of the SMPS member, the TX pad member, the TX short-range communication member, and the TX wireless power control member.

3. The electronic component storage container monitoring system according to claim 2, wherein each of the wireless power TX members further includes:

a wireless communication member for transmitting the state data of the electronic components for a corresponding storage container acquired from the wireless power RX members through short-range wireless communication.

* * * * *